United States Patent Office 3,692,462
Patented Sept. 19, 1972

3,692,462
DYEING SILK AND WOOL WITH CHROMABLE FIBER-REACTIVE AZO DYESTUFFS AND POLYGLYCOL-ETHER AMINES
Gerhard Back, Loerrach, Germany, and Heinz Abel, Reinach, Basel-Land, Arthur Buehler, Rheinfelden, and Alfred Litzler, Itingen, Switzerland, assignors to Ciba-Geigy AG
No Drawing. Filed Mar. 4, 1970, Ser. No. 16,618
Claims priority, application Switzerland, Mar. 10, 1969, 3,548/69
Int. Cl. C09b 62/50; D06p 1/38
U.S. Cl. 8—43                                              13 Claims

ABSTRACT OF THE DISCLOSURE

A process for dyeing natural protein fibres wherein dyeing is performed at 80 to 110° C. in the presence of a nitrogen-containing polyglycol derivative of an aliphatic compound of high molecular weight, a chromium-releasing agent and a water-soluble fibre-reactive, chromable mono- or disazo dyestuff containing groups capable of complex formation, at least one sulfonic acid group imparting solubility in water, and a fibre-reactive acylamino group.

---

The present invention relates to a process for dyeing natural protein fibres. The process is characterised in that dyeing is carried out at temperatures between 80 to 110° C. with chromable, fibre-reactive monoazo or disazo dyestuffs which in the ortho-positions on either side of at least one azo bridge carry groups capable of complex formation, and contain at least one sulphonic acid group which confers solubility in water and is not capable of complex formation and at least one fibre-reactive acylamino grouping which is derived from aliphatic monocarboxylic acids with 2 to 4 carbon atoms or from 5-membered to 6-membered heterocyclic structures, in the presence of polyglycol-ether derivatives of mono- amines or diamines, wherein at least one nitrogen atom is substituted by a hydrocarbon radical of 16 to 22 carbon atoms, and of a chromium-releasing agent.

The monoazo dyestuffs which are suitable for the present process correspond to the formula

wherein $R_1$ denotes an aryl radical which in the o-position to the azo bridge carries a group capable of complex formation, and $R_2$ denotes the radical of a coupling component which couples in the adjacent position to a hydroxyl, keto or amino group, with the radicals $R_1$ and $R_2$ being so chosen that the resulting dyestuff contains at least one acid sulphonic acid group conferring solubility in water which is not capable of complex formation and at least one fibre-reactive acylamino grouping.

The dyestuffs of formula

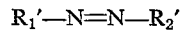

wherein $R_1'$ is the radical of a diazo component of the benzene or naphthalene series, especially a carboxybenzene, a hydroxybenzene or an naphthol radical, are particularly suitable. These radicals can possess the most diverse substituents, such as for example halogen atoms, amino, nitro, alkyl, alkoxy or acyl groups as well as acid groups which confer solubility in water and which are not capable of complex formation with the metal, for example carboxyl, sulphonic acid and sulphamide groups, β-sulphatoethyl-sulphone or β-sulphatoethyl-sulphamide groups. The amino groups mentioned are only introduced into the radical $R_1'$ or liberated, for example by reduction of a nitro group or by saponification of an acylamino group, after formation of the dyestuff.

The coupling component $R_2'$ is preferably a phenol, naphthol, naphthylamine or pyrazolone radical and essentially contains the same substituents as $R_1'$; furthermore $R_2'$ in most cases contains an amino group which can be acylated or is already acylated in the indicated manner.

The following groupings which are capable of forming the metal-dyestuff complex result from the substituents of $R_1'$ and $R_2'$: o,o'-dihydroxy-, o-hydroxy-o'-amino- or o-carboxy-o'-hydroxy-azo groups.

The dyestuffs for the present dyeing process can for example be obtained from the following diazo components and coupling components.

Diazo components: 4- or 5-chlor-2-amino-1-hydroxybenzene, 4-, 5- or 6-nitro-2-amino-1-hydroxybenzene, 4,6-dichlor-2-amino-1-hydroxybenzene, 3,4,6-trichlor-2-amino-1-hydroxybenzene, 4-chlor-5- or 6-nitro-2-amino-1-hydroxybenzene, 4-nitro-6-chlor-2-amino-1-hydroxybenzene, 6-nitro-4-methyl-2-amino-1-hydroxybenzene, 4-nitro-6-acetylamino-2-amino-1-hydroxybenzene, 6-nitro-4-acetylamino-2-amino-1-hydroxybenzene, 4,6-dinitro-2-amino-1-hydroxybenzene, 1-amino-2-hydroxynaphthalene, 2-aminobenzoic acid, 4- or 5-nitro-2-aminobenzoic acid, 5-acetylaminobenzoic acid, 2-aminobenzene-1-carboxylic acid-4- or -5-sulphonic acid, 2-amino-1-hydroxybenzene-4- or -5-sulphonic acid, 4-chlor-4-methyl-2-amino-1-hydroxybenzene-5- or -6-sulphonic acid, 4-nitro-2-amino-1-hydroxybenzene-6-sulphonic acid, 6-nitro-2-amino-1-hydroxybenzene-4-sulphonic acid and above all naphthalene compounds such as 2-amino-1-hydroxynaphthalene-4- or -8-sulphonic acid, 6-brom- or 6-methyl-1-amino-2-hydroxynaphthalene-4-sulphonic acid, and especially 1-amino-2-hydroxynaphthalene-4-sulphonic acid or 6-nitro-1-amino-2-hydroxynaphthalene-4-sulphonic acid; furthermore, 4-chlor- or 4-nitro-2-amino-1-hydroxybenzene-6-sulphonic acid amide, 6-nitro-2-amino-1-hydroxybenzene-4-sulphonic acid amide, 2-amino-1-hydroxybenzene-4- or -5-sulphonic acid amide, 2-amino-1-hydroxybenzene-4- or -5-sulphonic acid phenylamide, 2-amino-1-hydroxybenzene-4- or -5-sulphonic acid monomethylamide or dimethylamide, -N-β-sulphato-ethylamide, 4-methyl-2-amino-1-hydroxybenzene-5-sulphonic acid amide, 4-chlor-2-amino-1-hydroxybenzene-5-sulphonic acid methylamide, ethylamide, isopropylamide or phenylamide, 4-chlor-2-amino-1-hydroxybenzene-5-sulphonic acid dimethylamide, diethylamide, N-methyl-N-phenylamide, N-methyl-N-β-hydroxyethyamide, N-β-hydroxyethyl-N-phenylamide or N-ethyl-N-phenylamide and the corresponding compounds which instead of a sulphonic acid amide group possess a methylsulphone group, an ethyl sulphone group and especially a phenylsulphone group, a p-methyl- or p-chlorophenylsulphone group or a β-sulphatoethylsulphone group.

Coupling components: Hydroxybenzenes such as in p-cresol or p-tertiary amylphenol, 4-methyl-2-acetylamino-1-hydrorybenzene, 4-acetylamino-1-hydroxybenzene, 4-

(β-cyanethyl)-phenol, β-ketocarboxylic acid esters or amides, such as acetoacetic acid anilide and 1-acetoacetyl-amino-2, -3- or -4-chlorobenzene, 1-acetoacetylamino-4-acetylaminobenzene, pyrazolones such as 1-phenyl-3-methyl-5-pyrazolone, 1,3-diphenyl-5-pyrazolone, 1-(2'-, 3'- or -4'-chlorophenyl)-3-methyl-5-pyrazolone, 1-(2'-, 3'- or -4-methylphenyl)-3-methyl-5-pyrazolone, 1-(2',5'-dichlorophenyl)-3-methyl-5-pyrazolone, 1-(2'-ethyl- or 4'-ethylphenyl)-3-methyl-5-pyrazolone, 1-(naphthyl-(1')- or -(2') - 3 - methyl-5-pyrazolone, 1-phenyl-5-pyrazolone-3-carboxylic acid phenylamide, 1 - n - octyl-3-methyl-5-pyrazolone, hydroxyquinolines, barbituric acid and naphthylamines such as 6-brom-, 6-methoxy- or 6-methyl-2-aminonaphthalene, 2-phenyl-aminonaphthalene, 2-aminonaphthalene itself and the 2 - aminonaphthalene -1 - sulphonic acid which is known to lead to the same dyestuffs as 2-aminonaphthalene and can be coupled, with the $SO_3H$ group located in the 1-position being split off, but above all naphthols such as 6-bromo- or 6-methoxy-2-hydroxynaphthalene and especially 1-acetylamino-7-hydroxynaphthalene, 1-n-butyryl-amino-7-hydroxynaphthalene, 1-benzoylamino-7-hydroxynaphthalene, 1-carbethoxy-amino-7-hydroxynaphthalene, 8-chloro - 1 - hydroxynaphthalene, 5 - chloro - 1 - hydroxynaphthalene, 5,8-dichloro-1-hydroxynaphthalene, 4,8- or 5,8-dichloro-2-hydroxynaphthalene, 2-hydroxynaphthalene and optionally 1-hydroxynaphthalene, 1 - phenyl - 3-methyl-5-pyrazolone-2'-, -3'- or -4'-sulphonic acid, 2'-chloro-1-phenyl-3-methyl-5-pyrazolone-4'- or -5'- sulphonic acid, 2',5'-dichloro-1-phenyl-3-methyl-5-pyrazolone-4'-sulphonic acid, 1-(naphthyl-(1'))-3-methyl-5-pyrazolone-4'-, -5'-, -6'-, -7'- or -8'-sulphonic acid, 1-(naphthyl-(2'))-3-methyl-5-pyrazolone-6'- or -8'-sulphonic acid, 1-acetoacetylaminobenzene-4-sulphonic acid and above all 2-amino- or 2-hydroxynaphthalene-4-, -5-, -6- or -7-sulphonic acid, 1-hydroxynaphthalene-4-, -5- or -8-sulphonic acid, 2-phenylaminonaphthalene-3'- or -4'-sulphonic acid, 1-phenyl - 3.- methyl-5-pyrazolone-3'-sulphonic acid amide, -3'-sulphonic acid methylamide or -3'-sulphonic acid-β-hydroxyethylamide, amides of 2-aminonaphthalene-4-, -5- or -6-sulphonic acid, of 1-hydroxynaphthalene-4-, -5- or -8-sulphonic acid or of 2-hydroxynaphthalene-4-, -5-, -6- or -7-sulphonic acid, and also coupling components containing amino groups such as 1-(3'- or 4'-amino-phenyl)-3-methyl-5-pyrazolone, 4-amino-1-acetoacetylaminobenzene and especially aminonaphthols such as 1-amino-8-hydroxynaphthalene-3,6- or -4,6-disulphonic acid, 1-hydroxy-5-, -6- or -7-aminonaphthalene-3-sulphonic acid, 1-amino-8-naphthol-4-sulphonic acid, aminobenzoyl-H- and -K-acids, and also coupling components such as for example 1-hydroxy-5-β-chloropropionylaminonaphthalene - 3 - sulphonic acid, 1-α,β-dibromopropionylamino-8-hydroxynaphthalene - 3,6 - disulphonic acid, 2-hydroxy-6-chloracetylaminonaphthalene-8-sulphonic acid and 2-α,β-dibromopropionylamino-6-hydroxynaphthalene-8-sulphonic acid.

The dyestuff formation from diazo components and coupling components takes place according to known methods of azo coupling.

The suitable diasazo dyestuffs correspond to the general formula

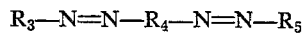

wherein $R_3$, $R_4$ and $R_5$ denote a carboxybenzene, a phenol or a naphthol radical and the radicals are so chosen that the resulting dyestuff contains, in the ortho-positions on either side of at least one azo bridge, the groups capable of complex formation, at least one carboxyl, sulphonic acid, sulphamide, sulphatoethylsulphone or sulphatoethylsulphonamide group which is not capable of complex formation and at least one fibre-reactive acylamino grouping.

The manufacture of these disazo dyestuffs is effected by coupling the diazo component $R_3$ with the coupling component $R_4$ and subsequently also coupling the diazo component $R_5$ with $R_4$. Another possibility consists of coupling the diazo component $R_3$ with a coupling component $R_4$ which contains a diazotisable amino group. The coupling product $R_3N=NR_4$ thereby becomes the new diazo component which is coupled with the coupling component $R_5$.

As starting materials for the manufacture of the disazo dyestuffs, it is possible to utilise the diazo components and coupling components already mentioned in the case of the manufacture of the monoazo dyestuffs.

The fibre-reactive acylamino grouping can already be obtained before the formation of the dyestuff by reaction of an acylating reagent with a diazo or coupling component containing an amino group which can be acylated, or can be introduced into the resulting dyestuff molecule after diazotisation and coupling by means of an appropriate reaction. Suitable fibre-reactive acylating agents are preferably aliphatic and heterocyclic acylating agents, such as for example α,β-dibromopropionic acid chloride or bromide, chloracetyl chloride, β-chloropropionic acid chloride, α- or β-bromacrylic acid chloride, acrylic acid chloride, chlorocrotonic acid chloride and propiolic acid chloride, and as heterocyclic acylating agents especially dihalogeno-1,3,5-triazines which can contain a further substituent, for example bonded via an oxygen, sulphur or nitrogen atom, on the hetero-ring. As alicyclic compounds, those acylating agents which contain a tetrafluorocyclobutane radical may be mentioned.

In the dyestuffs which are acylated as indicated and possess a β-chloropropionyl, α,β-dichloropropionyl or dibromopropionyl radical, these radicals can be converted into the corresponding unsaturated acyl radicals by splitting off hydrogen halide by means of agents which react alkaline.

The conversion of the monoazo dyestuffs into their 1:2 chromium complexes preferably takes place on the goods being dyed, as a result of the chromium-releasing agent which is simultaneously present. Suitable chromium-releasing agents are, amongst others, chromium fluoride, chromium sulphate, chromium formate, chromium acetate, potassium chromium sulphate, potassium chromium thiocyanate and the chromates or bichromates, the latter optionally mixed with other salts such as for example ammonium sulphate.

In order to avoid precipitation of sparingly soluble chromium salts in the dyebath, complex-forming agents which promote solubility, such as tartaric acid, citric acid, salicylic acid or lactic acid can be added.

The amount of chromium-releasing agent is so chosen that at least 1 metal atom is present per 2 molecules of monoazo dyestuff. Advantageously, however, an excess of metal is used, and ratios of 6 to 20 metal atoms to 2 molecules of dyestuff are possible. According to the invention, the dyestuff and the chromium-releasing agent can also be added to the dyebath as a ready preparation. The preparation is manufactured by conjointly grinding the dyestuff, the chromium-releasing agent and a neutral extender, such as sodium chloride, sodium sulphate, primary or secondary alkali phosphates, for example the appropriate sodium phosphates, dextrin or sucrose. The resulting preparation has good stability and is directly introduced into the dyebath.

As levelling agents it is possible to employ both nonionic and also ionic, that is to say anionic and cationic, nitrogen-containing compounds in the process according to the invention. Advantageously, polyglycol-ether derivatives of long-chain monoamines or diamines are used, with at least one nitrogen atom being substituted by the hydrocarbon radical of a long-chain fatty acid; furthermore, these adducts can also be quaternised at a nitrogen atom or esterified at the end of a polyglycol chain with a polybasic acid, or be both quaternised and esterified.

As starting substances, single-substance higher molecular alkylamines, or amine mixtures, such as are obtained on conversion of natural fatty acid mixtures, for example tallow fatty acid, into the corresponding amines, are used. Amines with 16 to 22 carbon atoms, to which at least 5 to 10 and not more than 60 to 70 mols of ethylene oxide are added on, are suitable. The following may be mentioned individually as amines: hexadecylamine, octadecylamine, arachidylamine $CH_3(CH_2)_{19}—NH$, behenyl-amine $CH_3(CH_2)_{21}—NH_2$, octadecenylamine and N-alkylpropylene - diamines with the appropriate hydrocarbon radicals.

Both the quaternisation and the esterification of the nitrogen-containing polyglycol-ether derivatives are advantageously carried out according to known methods, no intermediate isolation being necessary.

Customary alkylating and aralkylating agents, such as dimethylsulphate, ethyl bromide or benzyl chloride can be employed for the quaternisation; however, chloracetamide or ethylene hydrin are preferred as quarternising agents.

Organic polycarboxylic acids, such as for example maleic acid, or polybasic inorganic oxygen acids, such as phosphoric acid or sulphuric acid, can serve as polybasic oxygen acids for the formation of the acid esters. Instead of the acids it is possible to use their functional derivatives, such as acid anhydrides, acid halides, acid esters or acid amides. According to a particularly preferred embodiment, the acid sulphuric acid esters are directly manufactured in the form of their ammonium salts by warming the starting substances with amidosulphonic acid in the presence of urea. Both the quaternisation and the partial esterification are approximately carried out by simple mixing of the reagents with warming, appropriately to a temperature of between 50 and 100° C.

As particularly advantageous levelling agents there may be mentioned: the addition product of oleylamine and 8 mols of ethylene oxide and the mixture of (a) an adduct of 1 mol of tallow fatty amine (consisting of 30% of hexadecylamine, 25% of octadecylamine and 45% of octadecenylamine) and 7 mols of ethylene oxide, quaternised with chloracetamide, and (b) the ammonium salt of the acid sulphuric acid ester of the same non-quarternary adduct, as well as the individual components (a) and (b) of the mixture mentioned.

The amount of levelling agent in the dyebaths is about 0.5 to 2% of the fibre weight, depending on the amount of dyestuff employed.

Further additives which can be present in the dyebath are for example thickeners, salts and acids. The thickeners should be stable in an acid medium and should also not be destroyed by the presence of a metal-releasing agent. Such thickeners are, for example, British gum or etherified carubic acids. It is appropriate to use sodium sulphate, ammonium sulphate, or sodium chloride as salts, and aliphatic monocarboxylic or dicarboxylic acids which in addition to the carboxy carbon atom possess at most 4 carbon atoms in the aliphatic chain, as acids. However only the aliphatic monocarboxylic acids, such as formic acid or acetic acid, are of practical significance.

The amount of acid in the dyebath is 2 to 8% of the fibre weight, depending on the amount and nature of the dyestuff.

Natural nitrogen-containing fibres can be dyed according to the present process. Silk and above all wool may be mentioned. Any desired state of processing of the fibre material can be chosen. Particularly good results are achieved on dyeing unwoven wool, such as loose wool, tops or yarn, but woven fabrics of the fibre materials mentioned are also dyed with good results.

According to the invention, the dyestuffs are dyed from acid aqueous preparations according to the exhaustion process. The dyeing temperatures lie between about 80 and 110° C. The dyeing process is preferably carried out by first treating the material to be dyed with a dyeing preparation, which contains the dyestuff, the chromium-releasing agent and the auxiliary agents, for some time at temperatures below the boiling point of the dyebath and only then heating the dyebath to the boiling point or the temperatures above the boiling point, the process being carried out in pressure vessels in the latter case.

After the dyeing, the dyed goods are rinsed hot and cold, or, if demanded by the end use of the dyed material, soaped in the presence of non-ionic dispersing agents and/or wetting agents as well as dilute ammonia solution, in the course of which parts of the dyestuff which may possibly not have been adequately fixed are removed. Dyeings of excellent wet fastness and light fastness are obtained. Any desired colour shades can be obtained according to the present process, but above all dark shades such as navy blue or black.

In the examples which follow the parts, unless otherwise stated, denote parts by weight and the percentages denote percentages by weight.

EXAMPLE 1

100 kg. of wool yarn are wetted in 3000 l. of water at 50° C. The following additions are then made in order to prepare the dyebath: 4000 g. of 80% strength acetic acid, 1000 g. of 85% strength formic acid, 2000 g. of a mixture of (a) an adduct of 1 mol of tallow fatty amine and 7 mols of ethyleen oxide, quaternised with chloracetamide, and (b) the ammonium salt of the acid sulphuric acid ester of the same, non-quaternised, adduct, and 4000 g. of a mixture of 50% of potassium chromate and 50% of ammonium sulphate.

After uniform distribution of these chemicals, 6000 g. of the dyestuff of formula (1) 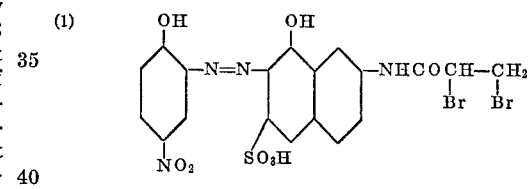

are added as a solution to the bath.

The dyebath is warmed to 80° C. in 30 minutes and left at this temperature for 20 to 30 minutes.

During this time at a constant temperature, the dyestuff is practically completely absorbed by the wool. The pH-value of the dyebath is between 4.5 and 4.1. Subsequently the whole is heated to the boil in 10 minutes and boiled for 60 to 90 minutes. The bath is then again cooled to 80° C. and a pH-value of 8.5 is set up by adding ammonia. As a result of this increase in the pH-value the small amount of non-fixed dyestuff is detached from the wool. After 20 minutes in this bath, the goods being dyed are after-treated by a thorough rinse, acidifying with 1000 g. of formic acid if appropriate. The material is then centrifuged and dried.

A level and very fast black dyeing of the wool results.

EXAMPLE 2

69.8 parts of the dyestuff (2), which is accessible by coupling 2 - α,β-dibromopropionylamino-8-hydroxynaphthalene-6-sulphonic acid with diazotised 1-hydroxy-2-amino-6-nitrobenzene-4-sulphonic acid in a weakly alkaline medium are ground together with 45 parts of potassium bichromate and 15 parts of dextrin.

Wool is dyed in full, fast black shades by means of the resulting stable dyestuff preparation in accordance with the dyeing process described in Example 1.

Similar dyestuff preparations are obtained if instead of potassium bichromate corresponding proportions of salts of trivalent chromium, such as for example the formate, the acetate, the sulphate or the fluoride are used.

Instead of the dyestuff mentioned, the following dyestuffs can also be used, with equally good results.

| No. | Metal-free dyestuff | Metal-releasing agent | Shade on woven wool fabric |
|---|---|---|---|
| 3 | 2-hydroxyphenyl(4-Cl)–N=N–(1-hydroxy-2-sulfo-naphthyl)–NHCOCHBrCH2Br | Potassium chromate | Violet. |
| 4 | 2-hydroxy-5-nitrophenyl–N=N–(1-hydroxy-2-sulfo-naphthyl)–NHCOCHBrCH2Br | Potassium bichromate | Blue-black. |
| 5 | 2-carboxyphenyl–N=N–(1-hydroxy-2-sulfo-naphthyl)–NHCOCHBrCH2Br | Potassium chromate | Claret. |
| 6 | 2-hydroxy-3-nitro-5-chlorophenyl–N=N–(1-hydroxy-2-sulfo-naphthyl)–NHCOCHBrCH2Br | Chromium acetate | Black. |
| 7 | 2-hydroxy-3-nitro-5-chlorophenyl–N=N–(1-hydroxy-2-sulfo-naphthyl)–NHCOCH2Cl | Potassium bichromate | Do. |
| 8 | 2-hydroxy-3-acetamido-5-nitrophenyl–N=N–(2-hydroxy-sulfo-naphthyl)–NHCOCH2CH2Br · Br | Potassium bichromate | Do. |
| 9 | 2-hydroxy-3,5-dichlorophenyl–N=N–(1-hydroxy-2-sulfo-naphthyl)–NHCOCHBrCH2Br | Potassium chromate | Navy blue. |
| 10 | 2-hydroxy-5-nitrophenyl–N=N–(1-NHCOCH2Cl-hydroxy-4-sulfo-naphthyl) | Chromium acetate | Blue. |
| 11 | 2-hydroxy-3-sulfo-5-chlorophenyl–N=N–(1-hydroxy-2-sulfo-naphthyl)–NHCOC(Br)=CH2 | Potassium bichromate | Grey-blue. |
| 12 | 2-hydroxy-5-nitrophenyl–N=N–(1-amino-2-hydroxy-sulfo-naphthyl with ClCH2CONHCH2 on ring) | do | Olive. |

TABLE—Continued

| No. | Metal-free dyestuff | Metal-releasing agent | Shade on woven wool fabric |
|---|---|---|---|
| 13 | (structure) | Chromium acetate | Yellow. |
| 14 | (structure) | Potassium chromate | Orange. |
| 15 | (structure) | Potassium bichromate | Red. |
| 16 | (structure) | Chromium acetate | Yellow. |
| 17 | (structure) | Potassium bichromate | Grey-green. |
| 18 | (structure) | ......do.......................... | Green-black. |
| 19 | (structure) | Potassium chromate | Violet. |
| 20 | (structure) | Potassium bichromate | Black. |

TABLE—Continued

| No. | Metal-free dyestuff | Metal-releasing agent | Shade on woven wool fabric |
|---|---|---|---|
| 21 | (structure) | Potassium bichromate | Black. |
| 22 | (structure) | Chromium acetate | Blue black. |
| 23 | (structure) | Potassium chromate | Violet. |
| 24 | (structure) | ...do... | Dark blue. |
| 25 | (structure) | ...do... | Navy blue. |
| 26 | (structure) | Potassium bichromate | Black. |
| 27 | (structure) | ...do... | Do. |
| 28 | (structure) | ...do... | Blue-black. |
| 29 | (structure) | ...do... | Violet-black. |

TABLE—Continued

| No. | Metal-free dyestuff | Metal-releasing agent | Shade on woven wool fabric |
|---|---|---|---|
| 30 | (structure: naphthol-azo with NO$_2$, Cl, OH, HO, SO$_3$H, NHCOC=CH$_2$ with Br) | Potassium bichromate | Navy blue. |
| 31 | (structure: OH, OH, HO$_3$S, Cl, N=N, NH-triazine(Cl)-NH-cyclohexyl) | Potassium chromium tartrate | Violet. |
| 32 | (structure: NO$_2$, OH, OH, HO$_3$S, N=N, NHCOCH=CH$_2$) | Potassium chromate | Blue-grey. |
| 33 | (structure: NO$_2$, OH, OH, HO$_3$S, N=N, NH-pyrimidine with Cl, Cl, Cl) | Potassium bichromate | Do. |
| 34 | (structure: NO$_2$, NO$_2$, OH, HO, SO$_3$H, N=N, NHCO-, NHCO-CHBr-CH$_2$Br) | do | Black. |

EXAMPLE 3

4 parts of 80% strength acetic acid, 2 parts of the ammonium salt of the acid sulphuric acid ester of the adduct of a fatty amine (consisting of 30% of hexadecylamine, 25% of octadecylamine and 45% of octadecenylamine) and 7 mols of ethylene oxide, and 2.5 parts of potassium bichromate are successively dissolved in 4000 parts of water at 50° C. After adding a solution of 5 parts of the dyestuff No. 8 of the table, 100 parts of pre-wetted wool yarn are introduced into the dyebath. The dyebath is warmed to 80° C. over the course of 20 minutes and left at this temperature for 20 to 30 minutes. Under these conditions the dyestuff is completely absorbed on the substrate. Thereafter the whole is heated to the boil in 10 minutes and left at this temperature for a further 60 minutes. After cooling to 80° C., the yarn which has been dyed deep black is thoroughly rinsed, centrifuged and dried. The fastness properties of the dyeing are as good as if an after-treatment with ammonia according to Example 1 had been carried out.

Dyeings of equal quality are obtained if instead of the levelling agent described, 2 parts of the adduct of tallow fatty amine and 30 mols of ethylene oxide are used.

EXAMPLE 4

100 parts of pre-wetted woven wool fabric are introduced at 50° C. into a dyebath prepared as in Example 3 but using dyestuff No. 27 of the table. The bath is warmed to 80° C. over the course of 30 minutes and left at 80 to 85° C. for a further 90 minutes. The dyestuff is completely absorbed.

The pH-value of the dyebath is raised from 4.5 to 8.5 by adding concentrated ammonia solution and the goods being dyed are after-treated for 20 minutes at 80° C. After thorough rinsing, the goods are treated with acid if appropriate, centrifuged and dried.

The woven fabric, dyed deep black, shows good fastness properties.

EXAMPLE 5

A dyebath is prepared in a pressure dyeing apparatus from 1000 parts of water at 50° C., 3 parts of 80% strength acetic acid, 1 part of the adduct of tallow fatty amine and 7 mols of ethylene oxide, quaternised with chloroacetamide and esterified with amidosulphonic acid/ urea, whereby the ammonium salt of the acid sulphuric acid ester of the quaternised adduct is produced, and 5 parts of the dyeing preparation described in Example 2 (dyestuff No. 2). After introducing 100 parts of woven wool fabric, the apparatus is closed so as to be pressure-tight, the temperature is raised from 50° to 106° C. over the course of 30 minutes and the apparatus left for a further 30 minutes at this temperature. After cooling to 80° C. the pressure is released and the dyebath is adjusted to pH 8.5 with ammonia solution and kept at 80° C. for a further 20 minutes. Thereafter the dyeing is finished as previously described. A woven fabric uniformly dyed blue-grey, having very good fastness properties, is obtained.

EXAMPLE 6

4 parts of 80% strength acetic acid, 2 parts of the adduct of tallow fatty amine and 70 mols of ethylene oxide and 2 parts of potassium bichromate are dissolved in 4000 parts of water at 50° C. After adding 4 parts of dyestuff No. 32 of the table, 100 parts of pre-wetted non-weighted natural silk yarn are introduced into the dyebath. The dyebath is warmed to 80° C. in 30 minutes and left at this temperature for a further 90 minutes. The goods being dyed are subsequently well rinsed, centrifuged and dried; they are dyed in a very fast deep blue-black shade.

EXAMPLE 7

62.5 parts of the dyestuff of constitution

(35)
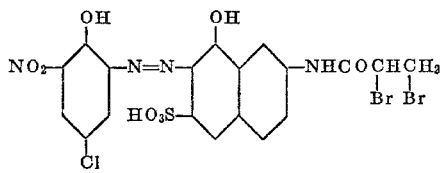

46 parts of potassium bichromate, 5 parts of primary sodium phosphate and 10 parts of secondary sodium phosphate are ground conjointly.

Wool yarn is dyed with the resulting dyeing preparation in accordance with the following process:

5 parts of 80% strength acetic acid, 2 parts of the levelling agent described in Example 1 and a solution of 8 parts of the above preparation are distributed in 4000 parts of water at 50° C. After introducing 100 parts of pre-wetted wool yarn, the dyebath is warmed to 80° C. over the course of 20 minutes and left for a further 20 minutes at this temperature. The dyestuff is completely absorbed on the goods being dyed. The whole is now heated to the boil in 10 minutes and boiled for a further 60 minutes. Thereafter the dyeing is finished as in Example 1. The wool yarn is dyed in a very fast, violet-black colour shade.

We claim:

1. A process for dyeing silk and wool fibers which comprises treating the fibers at a temperature between 80 and 110° C., in a single bath with
   (a) a monoazo or disazo dyestuff which contains,
      (i) for chromium complexing activity, a group selected from o,o'-dihydroxy-azo, o-hydroxy-o'-amino-azo, and o-carboxy-o'-hydroxy-azo,
      (ii) at least one sulfonic acid group which is not capable of complex formation and which confers water solubility to the dyestuff, and
      (iii) a fibre-reactive acylamino group where the acyl group is derived from a $C_2$ to $C_4$ aliphatic monocarboxylic acid or halogenated diazine or triazine,
   (b) a chromium-releasing agent, and
   (c) a levelling agent comprising a poly(alkylene) glycol-ether derivative of a $C_{16}$ to $C_{22}$ alkylmonoamine or diamine.

2. Process according to claim 1, which comprises employing monoazo dyestuffs of formula $$R_1—N=N—R_2$$

wherein $R_1$ denotes a benzene or naphthalene residue which in the ortho-position to the azo bridge carries a group capable of complex formation and $R_2$ denotes the radical of a coupling component selected from phenol, naphthol, naphthylamine and pyrazolone which couples in the adjacent position to the hydroxyl, keto or amino group, with the radicals $R_1$ and $R_2$ being so chosen that the resulting dyestuff contains at least one sulfonic acid group which confers solubility in water and which is not capable of complex formation, and at least one fiber-reactive acylamino grouping.

3. Process according to claim 1 which comprises employing monoazo dyestuffs of formula

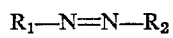

wherein $R_1'$ denotes a carboxybenzene, a phenol or a naphthol radical and $R_2'$ denotes a phenol, naphthol or pyradolone radical, with the radicals $R_1'$ and $R_2'$ being so chosen that the resulting dyestuff contains at least one sulfonic acid group, which is not capable of complex formation, and at least one fiber-reactive acylamino grouping.

4. Process according to claim 2, in which the coupling component $R_2$ contains a fiber-reactive acylamino grouping.

5. Process according to claim 1, which comprises employing disazo dyestuffs of formula $$R_3—N=N—R_4—N=N—R_5$$

wherein the radicals $R_3$, $R_4$ and $R_5$ denote a carboxybenzene, a phenol or a naphthol radical and the radicals are so chosen that the resulting dyestuff contains, in the ortho-positions on either side of at least one azo bridge, carboxyl, hydroxyl or amine groups capable of complex formation, to yield the group selected from o-o-dihydroxy-azo, o-hydroxy-o'-amino-azo, and o-carboxy-o'-hydroxy-azo; at least one sulfonic acid group not capable of complex formation and at least one fiber-reactive acylamino grouping.

6. Process according to claim 1 in which the fiber-reactive group is chloroacetylamino, 2-bromoacrylamino, 2,3-dibromopropionyl-amino or chlorotriazinyl-amino.

7. Process according to claim 1, which comprises employing a polyethyleneglycol-ether derivative of a fatty acid amine with 16 to 22 carbon atoms, which contain 5 to 70 —$CH_2CH_2$—O— groups in the molecule, as levelling agents.

8. Process according to claim 1, which comprises employing a mixture of polyethylene glycol-ether derivatives of fatty acid amines with 16 to 22 carbon atoms, which contain 5 to 10 —$CH_2CH_2$—O— groups in the molecule as the levelling agent, with a part of the nitrogen-containing polyglycol-ether derivatives being quaternised at the amine nitrogen atom and the other part being esterified at the end of the polyglycol chain by an organic polycarboxylic acid or polybasic inorganic oxygen acid.

9. Process according to claim 8, which comprises employing chlorine-containing quaternising agents.

10. Process according to claim 8, which comprises employing sulfuric acid or the acid anhydride, acid halide, acid ester or acid amide derivative thereof as the acid.

11. Process according to claim 1, which comprises employing alkali chromates or alkali bichromates as chromium-releasing agents.

12. Process according to claim 1, which comprises dyeing wool.

13. Stable dyestuff preparations for carrying out the process according to claim 1, wherein the dyestuff and the chromium-releasing agent are finely ground in the presence of sodium sulfate, dextrin or primary and secondary sodium phosphate.

References Cited

UNITED STATES PATENTS 3,211,514  10/1965  Casty et al. _____ 8—93
2,720,517  10/1955  Kartashoff et al. ____ 260—195
3,114,746  12/1963  Benz et al. _____ 260—163

OTHER REFERENCES

Bird: Theory and Practice of Wool Dye, 1963, pp. 110–112.

GEORGE F. LESMES, Primary Examiner

P. C. IVES, Assistant Examiner

U.S. Cl. X.R.

260—207; 8—1 E, 1 G, 1 H, 88